US012093617B2

(12) United States Patent
Jiang et al.

(10) Patent No.: US 12,093,617 B2
(45) Date of Patent: Sep. 17, 2024

(54) METHOD FOR THREE-DIMENSIONAL SPECIAL-SHAPED JET NOZZLE USED IN FIELD OF WATER-SAVING IRRIGATION IN FARMLAND

(71) Applicant: NANJING AGRICULTURAL UNIVERSITY, Nanjing (CN)

(72) Inventors: Xiaoping Jiang, Nanjing (CN); Weixing Cao, Nanjing (CN); Yan Zhu, Nanjing (CN); Jun Ni, Nanjing (CN); Yongchao Tian, Nanjing (CN); Bin Xu, Nanjing (CN); Jinzhao Hu, Nanjing (CN); Yaoyao Liao, Nanjing (CN); Xingchen Wang, Nanjing (CN); Ying Zhang, Nanjing (CN)

(73) Assignee: NANJING AGRICULTURAL UNIVERSITY, Nanjing (CN)

( * ) Notice: Subject to any disclaimer, the term of this patent is extended or adjusted under 35 U.S.C. 154(b) by 0 days.

(21) Appl. No.: 18/498,915

(22) Filed: Oct. 31, 2023

(65) Prior Publication Data

US 2024/0220689 A1 Jul. 4, 2024

(30) Foreign Application Priority Data

Dec. 28, 2022 (CN) .............................. 202211694691

(51) Int. Cl.
*G06F 30/28* (2020.01)
(52) U.S. Cl.
CPC .................................... *G06F 30/28* (2020.01)
(58) Field of Classification Search
CPC ....................................................... G06F 30/28
See application file for complete search history.

(56) References Cited

U.S. PATENT DOCUMENTS

2005/0023378 A1    2/2005  Gregory et al.
2021/0209275 A1*   7/2021  Zou .......................... G06F 30/17

FOREIGN PATENT DOCUMENTS

CN    201371094 Y    12/2009
CN    102975124 B    12/2015
(Continued)

OTHER PUBLICATIONS

Chunzhao Zhao, Chengliang Zhang, Cunzeng Bo, Ying Li, Guangfa Hao, Hongbin Dou, "Design and Optimization of Fan-Shaped Nozzle Structure Based on CFD," 2020 The 3rd International Conference on Power and Energy Applications, pp. 145-149 (Year: 2020).*

(Continued)

*Primary Examiner* — Steven W Crabb
(74) *Attorney, Agent, or Firm* — MUNCY, GEISSLER, OLDS & LOWE, P.C.

(57) ABSTRACT

Disclosed is a design method for a three-dimensional special-shaped jet nozzle used in the field of water-saving irrigation in farmland. According to a method based on a gas-liquid two-phase flow theory and computational fluid dynamics (CFD), a fan-shaped jet mode and a beam-shaped jet mode are coupled according to a certain area ratio and velocity ratio, which enables a cylindrical-conical coupling structure to be presented all the way from an inlet to an outlet of the nozzle, and a jet orifice is optimally designed into a three-dimensional special-shaped slotted structure; along a flowing direction of the jet orifice, V-shaped slots are formed in bottom and front portions of a midperpendicular plane, where a fan-shaped jet capable of forming a near-range water body prevails, and a strip-shaped slot is formed in an upper half portion of the midperpendicular plane, where a beam-shaped jet capable of forming a far-range water body prevails; and the V-shaped slots and the strip-shaped slot promote the formation of a narrow-band range S in a (Continued)

synergistic manner due to smooth joint transition therebetween. The present disclosure is particularly suitable for farmland sprinkling irrigation operations in non-planted areas such as tractor roads and field roads, and has the unique advantages of saving water and energy, and not rolling soil and crop seedlings.

6 Claims, 5 Drawing Sheets

(56) References Cited

FOREIGN PATENT DOCUMENTS

| | | |
|---|---|---|
| CN | 107448988 B | 5/2019 |
| CN | 110222467 A | 9/2019 |
| CN | 113536507 A | 10/2019 |
| CN | 115146555 A | 10/2022 |
| WO | WO-2017/143694 A1 | 8/2017 |

OTHER PUBLICATIONS

Mireia Altimira, et al., "Characterization of fan spray atomizers through numerical simulation," International Journal of Heat and Fluid Flow 30 (2009) 339-355 (Year: 2009).*

Aiping, Chen, "The Flow Field Stability and Structure Optimization of Drip Irrigation Device," Journal of Agricultural Mechanization Research, 2017, pp. 75-79, vol. 39, Issue 9, 1994-2023 China Academic Journal Electronic Publishing House.

* cited by examiner

METHOD FOR THREE-DIMENSIONAL SPECIAL-SHAPED JET NOZZLE USED IN FIELD OF WATER-SAVING IRRIGATION IN FARMLAND

TECHNICAL FIELD

The present disclosure belongs to the field of agricultural water-saving irrigation, and in particular to a design method for a three-dimensional special-shaped jet nozzle used in the field of water-saving irrigation in farmland.

BACKGROUND ART

Compared with the traditional irrigation modes such as flood irrigation and furrow irrigation, sprinkling irrigation is more water-saving and more adaptable to the farmland. Sprinklers and nozzles are the key components and important irrigation actuators for agricultural sprinkling irrigation systems. Their main performance parameters such as range, uniformity, and band width not only determine irrigation indicators such as water use efficiency and operating efficiency, but also will eventually affect crop yields, qualities and farmers' income.

Spray field refers to the area of land with a certain geometric shape wetted by the jet of a sprinkler; and different forms of sprinklers have different spray fields due to their different nozzle designs. At present, most farmland sprinkling irrigation uses a rocker-arm type sprinkler which has a circular outlet and is driven to intermittently rotate periodically through a certain structure. There are two main sprinkling irrigation methods: fixed sprinkling irrigation and mobile sprinkling irrigation. The single-sprinkler spray field of the fixed sprinkling irrigation is circular, and a combined spray mode is mostly employed in actual use. The mobile sprinkling irrigation has serious defects such as overspray in overlapping areas and spray leakage at the edges of fields, and the uniformity is difficult to greatly improve. For mobile sprinkling irrigation operations, a unit must go to the field, which will cause crushing of the soil and crops and damage to the soil structure in the field. Therefore, it is urgent to develop a narrow-band spray field jet sprinkler (including nozzle) that does not need for going to the fields, does not need for periodically sweeping back and forth, has no rotating mechanism, and can spray a high uniformity water band in the jet direction.

Nan Jianfu, et al. (CN 101497065A) disclosed a strip-shaped spray sprinkling irrigation sprinkler having rotating structures such as a main shaft and a radial flow closed impeller, which is suitable for strip-shaped water spray of row sown crops in field operations and has a larger structural size. A special-shaped sprinkler rotating magnetic jet polishing device of Cheng Haobo, et al. (CN 102975124B) is mainly used for precision optical surface polishing processing. A special-shaped sprinkler disclosed by Zhejiang Entive Smart Kitchen Appliance Co., Ltd. (CN 107448988B) includes a special-shaped body and a groove, which is mainly used for gas stoves. After search, no relevant reports have been found on narrow-band spray field jet sprinklers that can be used for fixed and mobile sprinkling irrigation modes, coupled with fan-shaped and beam-shaped jet modes, and can spray a uniform water band in the jet direction.

SUMMARY OF THE INVENTION

The present disclosure aims to provide a jet nozzle with a narrow-band spray field used for water-saving irrigation in farmland to solve the problems proposed in the above-mentioned background art. To achieve the above objective, the present disclosure adopts the following technical solution:

A design method for a jet nozzle with a narrow-band spray field used for water-saving irrigation in farmland is provided. According to a method based on a gas-liquid two-phase flow theory and computational fluid dynamics (CFD), a fan-shaped jet mode and a beam-shaped jet mode are coupled according to a certain area ratio and velocity ratio, which enables a cylindrical-conical coupling structure to be presented all the way from an inlet to an outlet of the nozzle, and a jet orifice is optimally designed into a three-dimensional special-shaped slotted structure; along a flowing direction of the jet orifice, V-shaped slots are formed in bottom and front portions of a midperpendicular plane, where a fan-shaped jet capable of forming a near-range water body prevails, and a strip-shaped slot is formed in an upper half portion of the midperpendicular plane, where a beam-shaped jet capable of forming a far-range water body prevails; and the V-shaped slots and the strip-shaped slot promote the formation of a narrow-band range S in a synergistic manner due to smooth joint transition therebetween.

Further, the specific process of the method based on the gas-liquid two-phase flow theory and the computational fluid dynamics (CFD) is described below.

By employing CAD three-dimensional modeling software, weak structures which have little influence on the formation of the narrow-band spray field or sprinkler performance are ignored by proper simplification, and thus physical models of a nozzle body (3), a variable-diameter rectifier tube (2) and a diversion elbow (1) corresponding to respective parameter tables are established uniformly.

By using a finite element analysis meshing tool and CFD fluid dynamics calculation software Fluent, on the basis of grid independence check, VOF model multiphase flow numerical simulation calculation and full flow field setting unsteady numerical simulation calculation are respectively carried out on all parameter sets of an external flow field near an outlet of the jet nozzle body (3) used in the established narrow-band spray field and an internal flow field established by fluids inside the nozzle body (3), the variable-diameter rectifier tube (2) and the diversion elbow (1).

Through post-processing analysis of all example models, the flow field and flow pattern distribution are checked; in combination with a turbulence model, a vortex structure and an energy dissipation mechanism, a main form, distribution rule and approximate proportion of energy loss in each of model examples are qualitatively and quantitatively analyzed, and main ways to improve structural physical models are analyzed and summarized; the optimal model is improved repeatedly, and the optimal parameters are determined; and according to the model processing, a prototype of the optimal model is trial-produced, whether the prototype meets the initial design objective is verified through experiments, and a jet sprinkler used for water-saving irrigation in the farmland with the narrow-band spray field, provided with a high uniformity jet nozzle body at the outlet, is finally finalized.

Further, the nozzle body (3) is optimized as a jet nozzle suitable for the narrow-band spray field, with an outer circle surface at a small-diameter end being conical; a three-dimensional duckbill-shaped profiled slot is vertically formed in the flow direction of a nozzle outlet (301) and is a V-shaped tangent slot from inside to outside, and a rabbet thereof gradually opens outwards and upwards; and a strip-shaped tangent slot is provided at an upper portion of the nozzle body (3), with a starting position extending backwards by a certain length or distance from a direction of an incoming flow, and the slot is uniform in width or has a small diffusion angle structure from inside to outside.

Further, the tangent slot width of the strip-shaped slot to an outermost side is narrower than or equal to the maximum slot width of the V-shaped slots, and intersecting lines of the two slotted structures are smooth in transition and thus promote the formation of a narrow-band jet surface in a synergistic manner without obvious cross-sectional changes, which ensures an irrigation uniformity coefficient.

Further, the product of the equivalent area of the strip-shaped slot and the mean jet velocity thereof is equal to the product of the equivalent area of the V-shaped slots and the mean jet velocity thereof, and the strip-shaped slot and the V-shaped slots are respectively responsible for forming water supply volumes required for jet sprinkling irrigation of far-end 50% and short-range 50% of the total range; and proportions of the short-range sector jet and the far-end beam-shaped jet in the total sprinkling irrigation flow rate are adjusted by adjusting the equivalent area and velocity integral of jet outlets of the strip-shaped slot and the V-shaped slots, provided that it is necessary to ensure the uniformity coefficient of sprinkling irrigation performance indicators.

Further, an inner wall face of an outer circle at a large-diameter end of the nozzle body (3) is provided with standard internal threads or tapered internal threads to be connected to external threads of the variable-diameter rectifier tube (2), which provides a passage for a high-speed incoming flow from the variable-diameter rectifier tube (2).

Further, top surfaces of the internal threads of the nozzle body (3) are designed and provided with a positioning step surface to cooperate with a small-end face of the variable-diameter rectifier tube (2) to form an end face seal; and before installation, an O-shaped ring can be padded or liquid sealant can be applied to the end face seal.

Further, six strip-shaped rectifier rib pieces (203) are circumferentially distributed at a front end of an inner wall of the variable-diameter rectifier tube (2).

The jet nozzle with a narrow-band spray field used for water-saving irrigation in farmland provided by the present disclosure, together with the nozzle body installed at a frontmost end of the jet sprinkler, has the following beneficial effects.

(1) In addition to being used for fixed-point positioning sprinkling irrigation, as this irrigation mode can be operated without going to the fields, the narrow-band spray field jet sprinkler described in the present disclosure can be installed and equipped on both sides of a mobile sprinkling irrigation machine and an irrigation unit, and the machine or the unit walks slowly along non-planting areas such as tractor roads and field roads, while performing farmland sprinkling and irrigation operations on both sides of the horizontal and vertical directions with the narrow-band spray field jet sprinklers; and therefore, the present disclosure has the advantages of saving water and energy, not rolling soil and crop seedlings, and the like. (2) Sprinkling irrigation range can be changed by adjusting parameters such as different inlet flow, inlet pressure, and sprinkler elevation angle. (3) Sprinkling irrigation intensity, irrigation water volume, and the like can form a closed loop with a soil profile moisture sensor based on the agricultural Internet of Things and other multi-source information diagnostic models and irrigation prescriptions so as to improve the accuracy of farmland crop irrigation and truly achieve on-demand water supply. (4) The structural design of the jet nozzle derives from the combination and selection of main structural parameters such as orthogonal optimization or response surface optimization, and uses CFX, Fluent and other flow field analysis software to complete the CFD fluid dynamics simulation and performance parameter optimization, which can greatly reduce the test workload and lower the research and development costs. (5) The important innovation of the present disclosure also lies in that by defining and designing the jet flow surface of the special-shaped nozzle to be the V-shaped tangent slot and the strip-shaped tangent slot formed by a series of cross-sectional areas with equivalent diameters varying from small to large, different equivalent diameters correspond to different nozzle flow rates and water tongue ranges, thus transforming the range uncertainty caused by the uncertain air resistance coefficient A into deterministic structural parameters at the jet outlet cross-section and the theoretical calculation of a range with piecewise superposition, and further achieving the theoretical calculation of the uniformity and controllability of the sprinkling water volume in the jet flow direction of the sprinkler and the nozzle.

Reference numerals on the drawings: 1 denotes a diversion elbow; 101 denotes a water inlet; 102 denotes threads; 103 denotes a locating ring; 2 denotes a variable-diameter rectifier tube; 201 denotes an O-shaped seal ring; 202 denotes pre-tightening bolts; 203 denotes rectifier rib pieces; 204 denotes matching threads; 3 denotes a nozzle body; 301 denotes a nozzle outlet; and 4 denotes a narrow band.

DETAILED DESCRIPTION OF THE INVENTION

In order to make the features and advantages of the present disclosure more comprehensible, the present disclosure will be further described below in conjunction with accompanying drawings 1 to 8 and specific embodiments, but the scope of protection of the present disclosure is not limited thereto.

Figure 1:
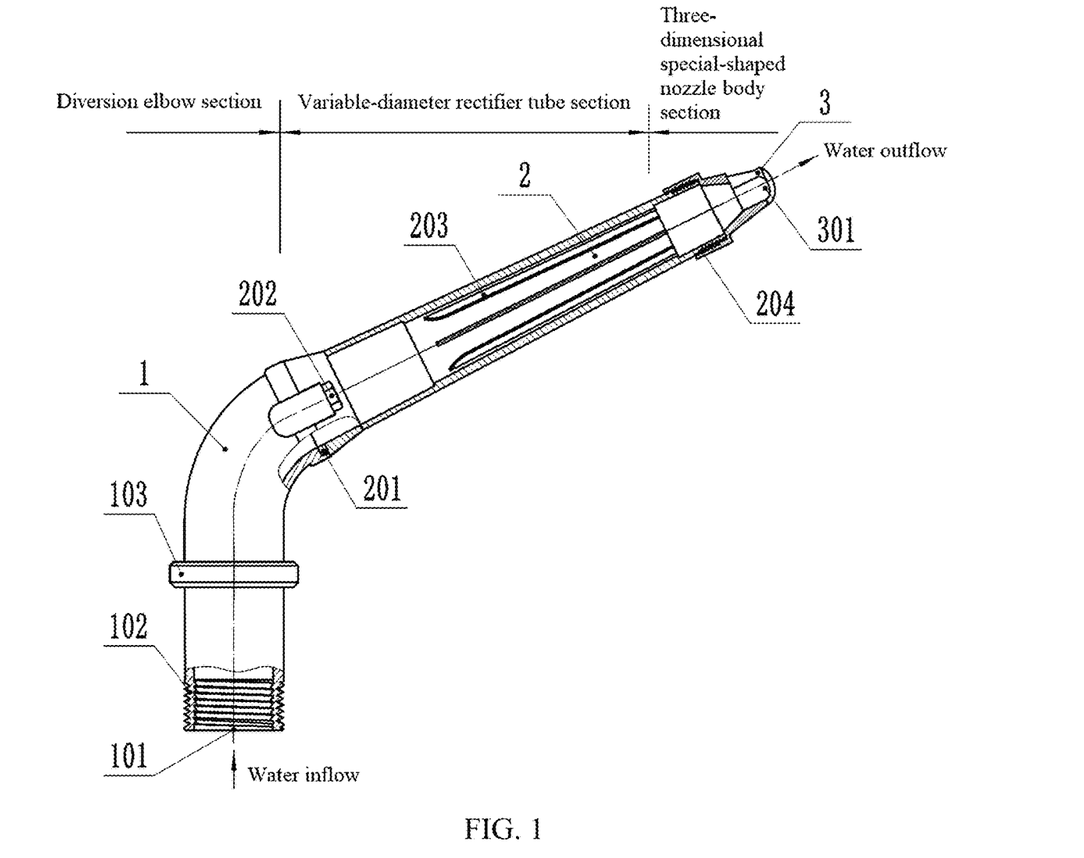
FIG. 1 is a main structural diagram of a narrow-band spray field jet sprinkler.

FIG. 1 is a design example of a jet nozzle with a narrow-band spray field used for water-saving irrigation of farmland described in the present disclosure. The rated working pressure P of a nozzle body and a sprinkler is 0.3 MPa, the rated spray irrigation flow rate Q is 10 m³/h, the designed range S is 25 m, the far-end band width is less than or equal to 1 m, the near-end band width range is more than or equal to 0.5 m, and the difference between the far-end band width and the near-end band width is not more than 0.5 m.

Figure 2:
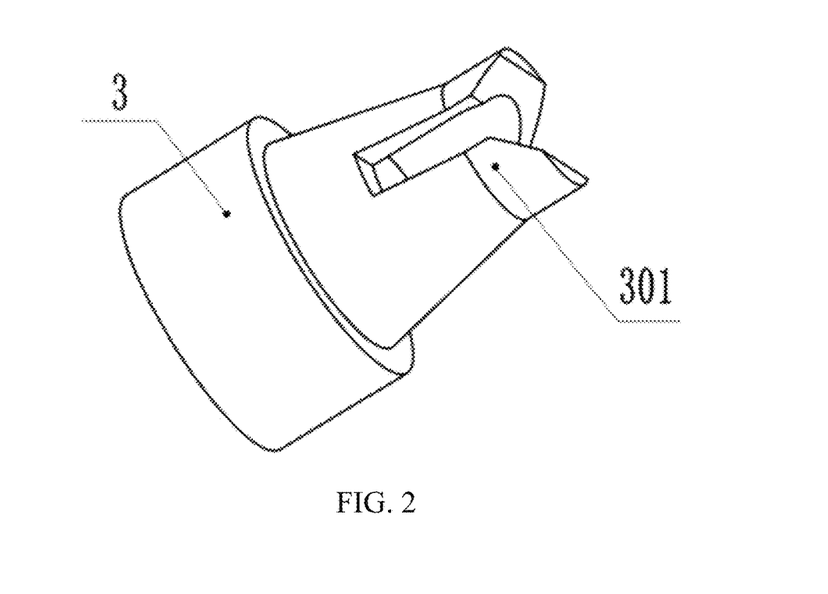
FIG. 2 is an enlarged isometric view of a three-dimensional special-shaped jet nozzle body (3).

The sprinkler consists of three sections: a nozzle body (3), a variable-diameter rectifier tube (2), and a diversion elbow (1). As shown in FIG. 2, the nozzle body (3) is a three-dimensional special-shaped nozzle body, is located at a frontmost end, has the smallest volume, and is an energy converter of the narrow-band spray field jet sprinkler. A three-dimensional special-shaped flow channel at a jet end of the nozzle body is the core jet source for forming the characteristics of the narrow-band spray field. Its structural design is based on numerical simulation and optimization of the flow field. The equivalent diameter of an outflow surface of a jet orifice is 10.9 mm.

The large-diameter end of the three-dimensional special-shaped nozzle body (3) is a cylindrical surface of φ 30 mm, an inner wall face of which is provided with M24 standard internal threads, and the standard internal threads are configured to be connected to M24 external threads of the variable-diameter rectifier tube (2), thus providing a passage for an incoming flow from the variable-diameter rectifier tube (2).

Top surfaces of the internal threads at the large-diameter end φ 30 mm of the three-dimensional special-shaped nozzle body (3) are designed and provided with a positioning step surface with diameter of φ 25 mm×width of 2.8 mm, which is configured to cooperate with a small-end face of the variable-diameter rectifier tube (2) to form an end face seal; and before installation, an O-shaped seal ring with diameter of φ 25 mm×width of 1.8 mm can be padded or liquid sealant can be applied to the end face seal.

Figure 3:
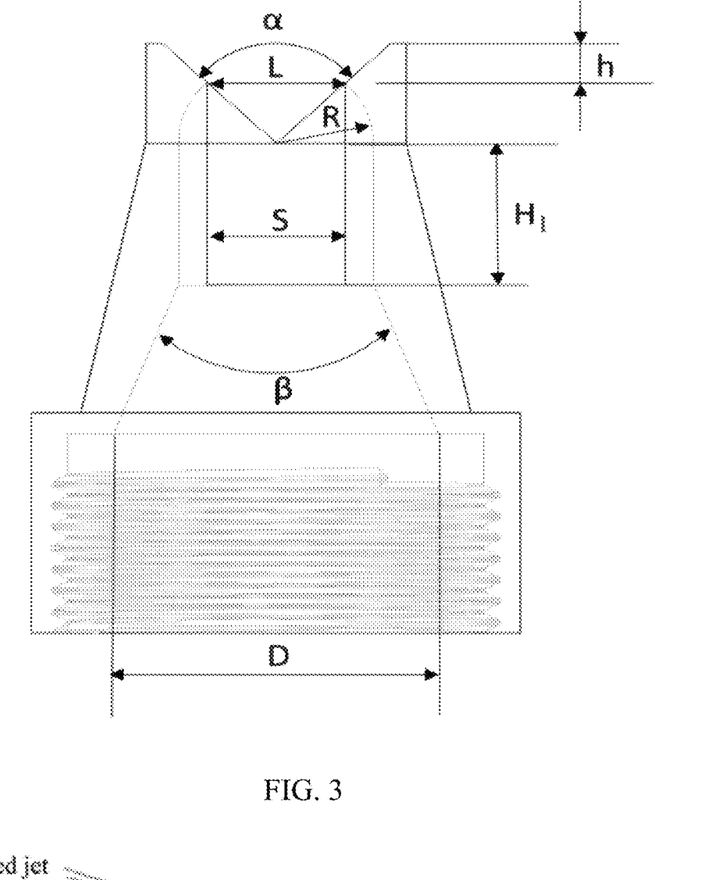
FIG. 3 shows main structural parameters of a jet orifice of the three-dimensional special-shaped nozzle body (3).

The small-diameter end of the three-dimensional special-shaped nozzle body (3) is a conical surface with a cone angle equal to 25°. A three-dimensional duckbill-shaped profiled slot is vertically formed in the jet flow direction of a nozzle outlet (301), which is provided with V-shaped slots with slotting angles of 80° at bottom and front portions, and rabbets thereof gradually open outwards and upwards, forming a main configuration of a short-range sector jet water body. A strip-shaped tangent slot with an mean width of 5.1 mm is formed in an upper portion, with a starting position extending backwards by 9.6 mm from the direction of an incoming flow, forming a main configuration of a far-end beam-shaped jet water body.

For the three-dimensional special-shaped slots of this embodiment, the width of the upper strip-shaped tangent slot is 5.1 mm, and the ratio of the maximum width of two intersecting lines formed by the lower front V-shaped tangent slot and the inner flow surface is 1:1. The intersecting lines of the two slotted structures are smooth in transition and thus promote the formation of a narrow-band jet surface in a synergistic manner without obvious cross-sectional changes, which ensures the irrigation uniformity coefficient.

As an embodiment, the variable-diameter rectifier tube (2) and the diversion elbow (1) are connected with each other by single-end-face sealing and padded with a 35×2.65 O-shaped seal ring (201), and two M8×10 pre-tightening bolts (202) are disposed at an outer ring of the O-shaped seal ring to achieve connection and pre-tightening. Inner and outer surfaces of a water inlet (101) of the diversion elbow (1) are designed with M40 standard metric external threads with lengths of 20 mm and M30 standard metric internal threads (102) with lengths of 20 mm, respectively, so as to facilitate matching and connection with M40 internal threads and M30 standard metric external threads. The outer diameter and inner diameter of the variable-diameter rectifier tube (2) are respectively 42 mm and 30 mm at the large-diameter end, and are respectively 27 mm and 20 mm at the small-diameter end. Six strip-shaped rectifier rib pieces (203) are circumferentially distributed at a front end of an inner wall of the variable-diameter rectifier tube.

According to the three-dimensional duckbill-shaped profiled slot of this embodiment, the product of the equivalent area of the upper strip-shaped slot and the mean jet velocity thereof is 5.07 m³/h, the product of the equivalent area of the lower front V-shaped slots and the mean jet velocity thereof is 4.96 m³/h, and the two products are roughly equal to each other and respectively contribute to the formation of the water supply volumes required for jet sprinkling irrigation of about far-end 50% and near-range 50% jet of the total range S=24.5 m. The proportions of the near-range fan-shaped jet and the far-end beam-shaped jet in the total flow rate can also be adjusted by adjusting the equivalent area and mean velocity of jet outlets of the strip-shaped slot and the V-shaped slots.

Figure 8:
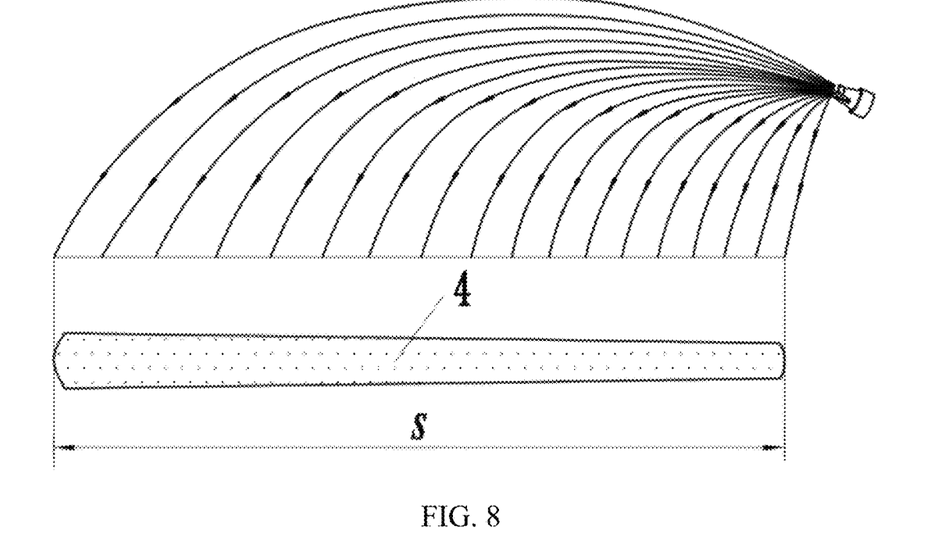
FIG. 8 is an operation narrow-band diagram of the narrow-band spray field jet sprinkler provided with the three-dimensional special-shaped nozzle body (3).

When incoming irrigation flows enter the sprinkler from the diversion elbow (1) at a rated flow rate of 10 m³/h and a rated pressure of 0.3 MPa, their flow directions are changed by the diversion elbow (1) in turn, the variable-diameter rectifier tube (2) performs primary rectification and variable-diameter acceleration, the three-dimensional special-shaped nozzle body (3) performs secondary flow control and energy form conversion, and the incoming irrigation flows are finally jetted at a high speed from the nozzle outlet in a form of narrow-band flow. A long-strip narrow band with uniform water distribution and slightly diffused band width shown in FIG. 8 is formed from near to far. The range S reaches 24.5 m, the far-end narrow band width is 0.96 m, the near-end narrow band width is 0.53 m, and the parameter errors are all less than ±5%, which are within the range of design requirements. Different ranges and corresponding band widths can also be realized by adjusting different inlet flow rates, different inlet pressures and different sprinkler elevation angles.

Figure 4:
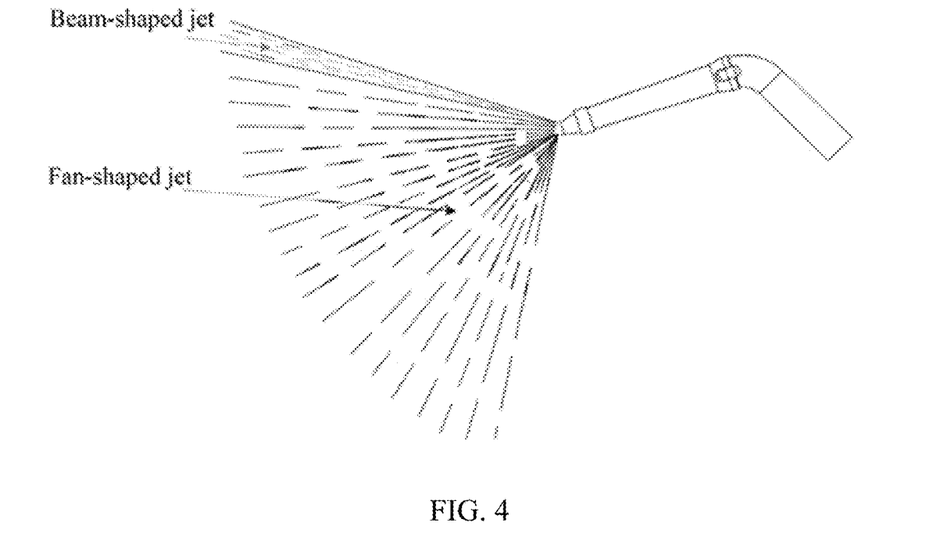
FIG. 4 shows the trajectory of a water tongue near the jet orifice of the three-dimensional special-shaped nozzle body (3).

According to the basic requirements for water-saving irrigation in farmland, combined with the actual situation of standardized farmland and ordinary fields, the main performance parameters and structural design parameters, such as flow rate Q, pressure P, range S, pitch angle θ, nominal diameter DN and nozzle diameter d, of a narrow-band jet nozzle to be invented and their value ranges are firstly determined. A water tongue motion trajectory equation, as shown in formula (1), at time t on the x-axis of the jet direction under the condition of considering air resistance is established by utilizing the water tongue characteristic parameters such as nozzle pressure head $P_0$, initial jet velocity $v_0$, water tongue height $H_0$, and initial included angle (pitch angle) $\theta_0$ in the horizontal jet direction.

$$y = x \operatorname{tg} \theta_0 - \frac{x^2}{4P_0\left(1 - \frac{\lambda x}{d\cos\theta_0}\right)\cos^2\theta_0} \tag{1}$$

When y is equals to 0, the jet trajectory x of the sprinkler (nozzle) system achieves a horizontal range S, which is:

$$S = \frac{2P_0\sin2\theta_0}{1+4\lambda\left(\frac{P_0}{d}\right)\sin\theta_0} \quad (2)$$

In the above two formulas, λ denotes the air resistance coefficient, the value of λ depends on the nozzle pressure head $P_0$ and the water tongue diameter (d at the nozzle outlet), and the value of λ is calculated according to formula (3):

$$\lambda 1 = 1 - e^{-p_0/1.5d} \quad (3)$$

The mathematical model of the jet water tongue movement is established by the formulas (1) to (3). When the water tongue is ejected from the nozzle, under the action of air disturbance, the farther away from the nozzle, the larger the diameter of the water tongue will be. It involves complex viscous fluid dynamics theories such as jet fragmentation and gas-liquid two-phase flow, and there is no theoretical solution yet.

The important innovation of the present disclosure also lies in that by defining and designing the jet flow surface of the special-shaped nozzle to be the V-shaped tangent slot and the strip-shaped tangent slot formed by a series of cross-sectional areas with equivalent diameters varying from small to large, different equivalent diameters correspond to different nozzle flow rates and water tongue ranges, thus transforming the range uncertainty caused by the uncertain air resistance coefficient λ into deterministic structural parameters at the jet outlet cross-section and the theoretical calculation of a range with piecewise superposition, and further achieving the theoretical calculation of the uniformity and controllability of the sprinkling water volume in the jet flow direction of the sprinkler and the nozzle.

Furthermore, in order to verify the correctness of theoretical calculations and parameter selection, the total range S is taken as a general target parameter, and each of equivalent cross-sectional areas $S_i$ is taken as a sub-target, and the parameter array that affects the target parameters S and $S_i$ is analyzed and determined. According to a weight analysis method, the main influencing factors $P_0$, equivalent diameter $d_i$, slotting angle $\beta_i$, and the like are determined; an orthogonal optimization method, a response surface optimization method, or the like is used to calculate so as to derive multi-factor and multi-level optimization data tables; and a multi-parameter optimization model based on multi-objective functions is established.

By employing CAD three-dimensional modeling software, weak structures which have little influence on the formation of the narrow-band spray field or sprinkler performance are ignored by proper simplification, and thus entity physical models and water body physical models of the nozzle body (3), the variable-diameter rectifier tube (2) and the diversion elbow (1) corresponding to respective parameter tables are established uniformly.

TABLE 1

Nozzle structure parameter table

| Name of parameter | Symbol | Value | Unit |
|---|---|---|---|
| Slotting angle | α | 85 | ° |
| Fan-shaped jet outlet width | L | 8.14 | mm |
| Hemispherical jet orifice radius | R | 5 | mm |
| Beam-shaped jet | S | 8.14 | mm |

TABLE 1-continued

Nozzle structure parameter table

| Name of parameter | Symbol | Value | Unit |
|---|---|---|---|
| outlet width | | | |
| Contraction angle | β | 40 | ° |
| Length of straight pipe section | $H_1$ | 10 | mm |
| Inlet diameter | D | 20 | mm |
| Hole margin | h | 2.6 | mm |

TABLE 2

Some parameters of the diversion elbow and the variable-diameter rectifier tube

| | | |
|---|---|---|
| Curvature of the diversion elbow | 63 | ° |
| Straight section of the variable-diameter rectifier tube | 160 | mm |
| Straight section of the diversion elbow | 80 | mm |

Figure 6:
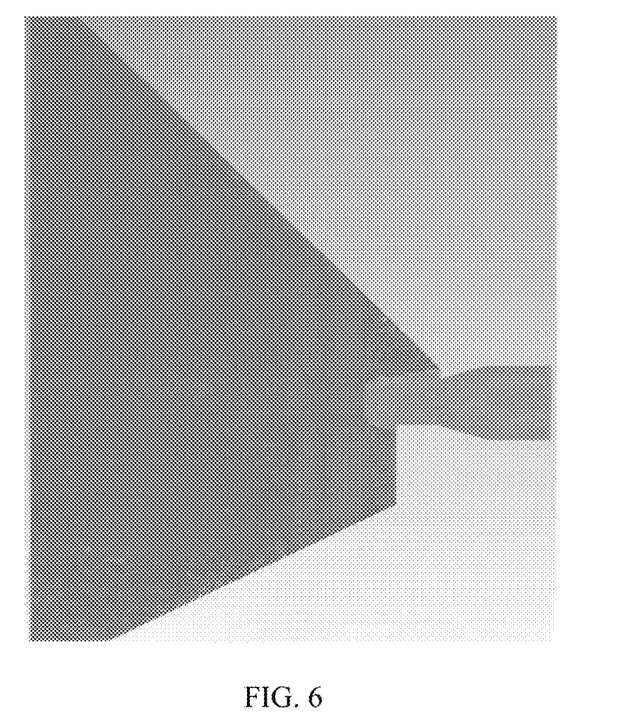
FIG. 6 shows mesh division of a gas-liquid two-phase physical model of an external flow field of the nozzle body (3).

By using a finite element analysis meshing tool and CFD fluid dynamics calculation software Fluent, on the basis of grid independence check, VOF model multiphase flow numerical simulation calculation and full flow field setting unsteady numerical simulation calculation are respectively carried out on all parameter sets of an external flow field near the outlet of the jet nozzle body (3) used in the established narrow-band spray field and an internal flow field established by the part of fluid inside the nozzle body (3), the variable-diameter rectifier tube (2) and the diversion elbow (1).

Through the post-processing analysis of all example models, the flow field and flow pattern distribution are checked. In combination with a turbulence model, a vortex structure and an energy dissipation mechanism (the turbulence model, the vortex structure, and the energy dissipation mechanism involved are all known standard models, which can be directly called for calculation), the main form, distribution rule and approximate proportion of energy loss in each of model examples are qualitatively and quantitatively analyzed, and the main ways to improve structural physical models are analyzed and summarized. Compared with the analytical solution, the optimal model is improved repeatedly, and the optimal parameters are determined. According to the optimal model processing, a prototype of the optimal model is trial-produced, whether the prototype meets the initial design objective is verified through experiments, and the jet sprinkler with a narrow-band spray field used for water-saving irrigation in farmland, which is provided with a high uniformity jet nozzle at the outlet, is finally finalized.

Figure 5:
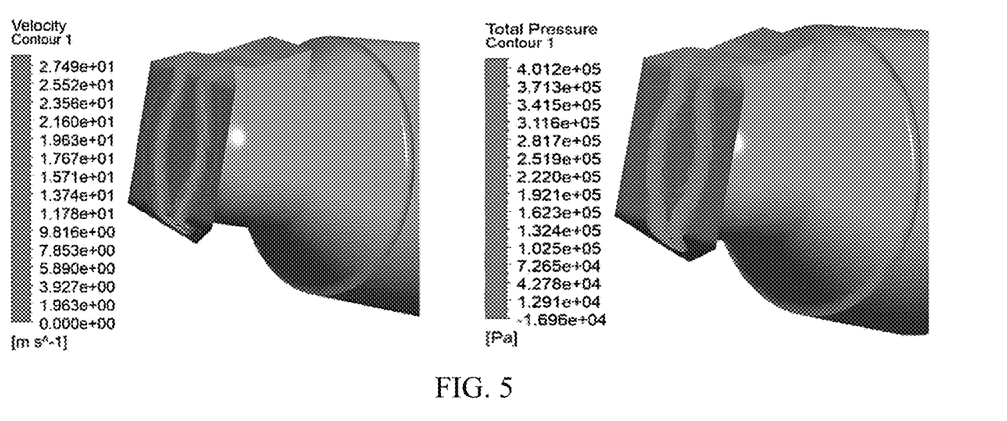
FIG. 5 is a velocity distribution and pressure distribution cloud diagram of CFD numerical simulation of an internal flow field of the nozzle body (3).
Figure 7:
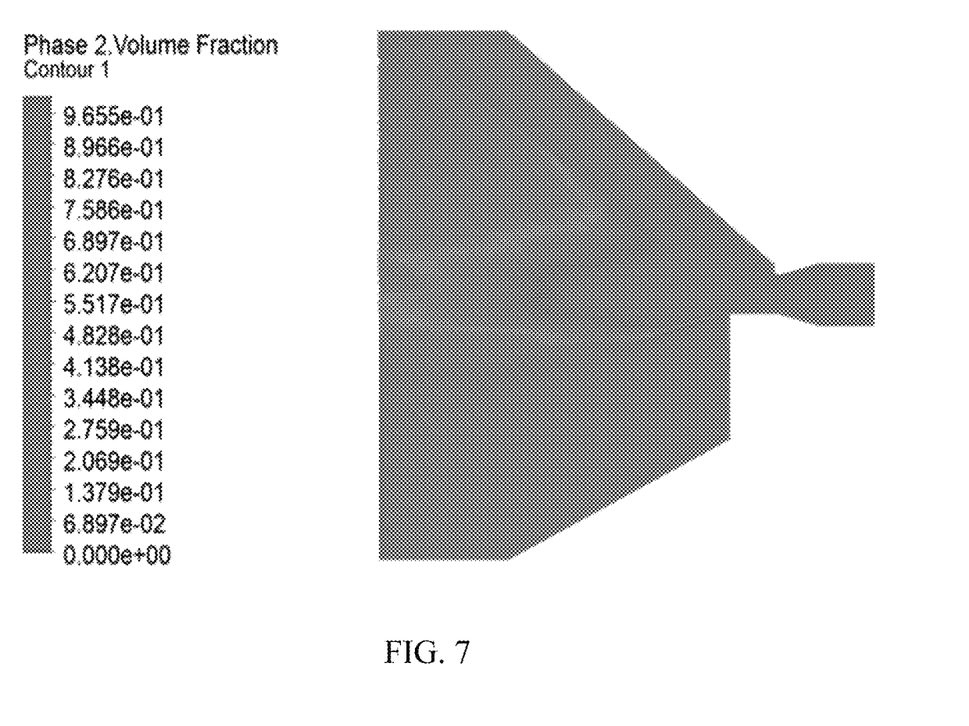
FIG. 7 shows the liquid phase percentage content calculated by numerical simulation of a VOF model for the external flow field of the nozzle body (3).
Figure 9:
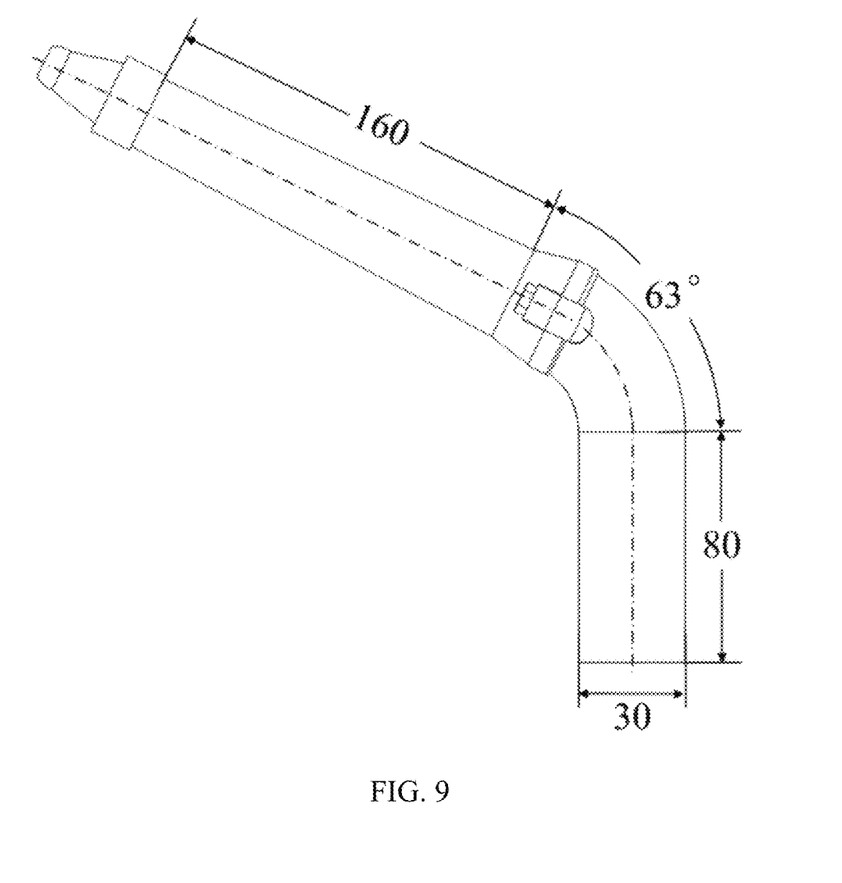
FIG. 9 shows structural parameters of a sprinkler body and a spray pipe of the narrow-band spray field jet sprinkler.

FIG. 5 is a velocity distribution and pressure distribution cloud diagram of CFD numerical simulation of an internal flow field of the nozzle body (3). It can be seen that the velocity and pressure of the two slit jets are relatively smooth in transition and stable in gradient changes. FIG. 6 shows mesh division of a gas-liquid two-phase model of an external flow field of the nozzle body (3). FIG. 7 is a liquid phase percentage diagram obtained by post-processing through a VOF turbulence model and gas-liquid two-phase numerical simulation calculation carried out for the external flow field 100 mm away from the jet orifice. It can be seen that each of the liquid phases of the two slit jets has formed a jet distribution law with uniform change trend and distinct concentration areas, laying a good foundation for the nozzle jet to form a uniform narrow band S. FIG. 9 shows structural parameters of a sprinkler body and a spray pipe of the narrow-band spray field jet sprinkler.

The working process of the three-dimensional special-shaped jet sprinkler used for water-saving irrigation in farmland with the narrow-band spray field described in the present disclosure is as follows:

The irrigation water flows enter the sprinkler from a water inlet end (101) of the diversion elbow (1) at a certain speed and pressure, their flow directions are changed by the diversion elbow (1) in turn, the variable-diameter rectifier tube (2) performs primary rectification and variable-diameter acceleration, the three-dimensional special-shaped nozzle body (3) performs secondary flow control and energy form conversion, the irrigation water flows are finally jetted at a high speed from the nozzle outlet in a form of narrow-band flow, and a long-strip narrow band (4) with uniform water distribution and slightly diffused band width is formed from near to far; and different ranges can be realized by adjusting different inlet flow rates (i.e., velocities), inlet pressures, sprinkler elevation angles, and the like.

Finally, it should be understood that the above embodiments are only used to illustrate the present disclosure and are not intended to limit the scope of the present disclosure. After reading the present disclosure, modifications in various equivalent forms to the present disclosure by those skilled in the art fall within the scope defined by the appended claims of the present application.

The invention claimed is:

1. A design method for a jet nozzle with a narrow-band spray field used for water-saving irrigation in farmland, comprising:
    coupling a fan-shaped jet mode and a beam-shaped jet mode according to an area ratio and a velocity ratio based on a gas-liquid two-phase flow theory and computational fluid dynamics (CFD);
    presenting a cylindrical-conical coupling structure from an inlet to an outlet of the jet nozzle;
    designing a jet orifice into a three-dimensional special-shaped slotted structure;
    forming V-shaped slots in bottom and front portions of a midperpendicular plane along a flowing direction of the jet orifice, wherein a fan-shaped jet forms a near-range water body prevails, a strip-shaped slot is formed in an upper half portion of the midperpendicular plane, a beam-shaped jet forms a far-range water body prevails; and the V-shaped slots and the strip-shaped slot promote the formation of a narrow-band range S in a synergistic manner due to smooth joint transition therebetween;
    ignoring weak structures which have little influence on the formation of the narrow-band spray field by simplification and by employing CAD three-dimensional modeling software, establishing physical models of a body of the jet nozzle, a variable-diameter rectifier tube and a diversion elbow corresponding to respective parameter tables;
    carrying out volume of fluid (VOF) model multiphase flow numerical simulation calculation and full flow field setting unsteady numerical simulation calculation respectively on all parameter sets of an external flow field near an outlet of the body of the jet nozzle used in the established narrow-band spray field and an internal flow field established by the part of fluid inside the body of the jet nozzle, the variable-diameter rectifier tube and the diversion elbow by using a finite element analysis meshing tool and a fluid dynamics calculation software, on the basis of grid independence check;
    checking the external flow field, the internal flow field and flow pattern distribution through post-processing analysis of all example models; analyzing qualitatively and quantitatively a vortex structure and an energy dissipation mechanism, a main form, distribution rule and approximate proportion of energy loss in all the example models in combination with a turbulence model, analyzing and summarizing main ways to improve structural physical models; improving an optimal model repeatedly, and determining the optimal parameters; producing a prototype of the optimal model according to the post-processing analysis of all the example models, verifying whether the prototype meets an initial design objective through experiments, and finalizing the jet nozzle used for water-saving irrigation in the farmland with the narrow-band spray field, provided with a high uniformity at the outlet of the body of the jet nozzle; and
    optimizing the body of the jet nozzle suitable for the narrow-band spray field, with an outer circle surface at a small-diameter end being conical; forming a three-dimensional duckbill-shaped profiled slot vertically in the flow direction of an outlet of the jet nozzle, wherein the three-dimensional duckbill-shaped profiled slot is a V-shaped tangent slot from inside to outside, and a rabbet thereof gradually opens outwards and upwards; providing a strip-shaped tangent slot at an upper portion of the body of the jet nozzle with a starting position extending backwards by a certain length or distance from a direction of an incoming flow, wherein the strip-shaped tangent slot is uniform in width or has a small diffusion angle structure from inside to outside.

2. The design method for the jet nozzle with the narrow-band spray field used for water-saving irrigation in farmland according to claim 1, wherein a tangent slot width of the strip-shaped slot to an outermost side is narrower than or equal to a maximum slot width of the V-shaped slots, and intersecting lines of the two slotted structures are smooth in transition and thus promote the formation of a narrow-band jet surface in a synergistic manner without obvious cross-sectional changes, which ensures an irrigation uniformity coefficient.

3. The design method for the jet nozzle with the narrow-band spray field used for water-saving irrigation in farmland according to claim 2, wherein the product of an equivalent area of the strip-shaped slot and a mean jet velocity thereof is equal to the product of an equivalent area of the V-shaped slots and a mean jet velocity thereof, and the strip-shaped slot and the V-shaped slots are respectively responsible for forming water supply volumes required for jet sprinkling irrigation of far-end 50% and short-range 50% of a total range; and proportions of the near-range fan-shaped jet and the far-end beam-shaped jet in the total sprinkling irrigation flow rate are adjusted by adjusting the equivalent area and velocity of jet outlets of the strip-shaped slot and the V-shaped slots, wherein the uniformity coefficient of sprinkling irrigation performance indicators is ensured.

4. The design method for the jet nozzle with the narrow-band spray field used for water-saving irrigation in farmland according to claim 1, wherein an inner wall face of an outer circle at a large-diameter end of the body of the jet nozzle is provided with standard internal threads or tapered internal threads to be connected to external threads of the variable-diameter rectifier tube providing a passage for a high-speed incoming flow from the variable-diameter rectifier tube.

5. The design method for the jet nozzle with the narrow-band spray field used for water-saving irrigation in farmland according to claim 4, wherein top surfaces of the standard internal threads or tapered internal threads of the body of the jet nozzle are designed and provided with a positioning step surface to cooperate with a small-end face of the variable-diameter rectifier tube to form an end face seal; and before installation, an O-shaped ring is added or liquid sealant is applied to the end face seal.

6. The design method for the jet nozzle with the narrow-band spray field used for water-saving irrigation in farmland according to claim 1, wherein six strip-shaped rectifier rib pieces are circumferentially distributed at a front end of an inner wall of the variable-diameter rectifier tube.

* * * * *